United States Patent [19]

Payvar

[11] Patent Number: 5,101,953
[45] Date of Patent: * Apr. 7, 1992

[54] HIGH CAPACITY VISCOUS PUMPING GROOVE PATTERN FOR A WET CLUTCH

[75] Inventor: Parviz Payvar, Naperville, Ill.

[73] Assignee: Borg-Warner Automotive Transmission & Engine Components Corporation, Sterling Heights, Mich.

[ * ] Notice: The portion of the term of this patent subsequent to Feb. 26, 2008 has been disclaimed.

[21] Appl. No.: 492,684

[22] Filed: Mar. 13, 1990

Related U.S. Application Data

[63] Continuation-in-part of Ser. No. 907,937, Sep. 16, 1986, Pat. No. 4,995,500.

[51] Int. Cl.⁵ .................... F16D 13/64; F16D 13/74
[52] U.S. Cl. ........................ 192/107 R; 192/113 B; 188/218 XL
[58] Field of Search ............ 192/70.12, 70.14, 107 R, 192/107 M, 113 B; 188/218 XL, 264 B, 264 D, 264 E

[56] References Cited

U.S. PATENT DOCUMENTS

| | | | |
|---|---|---|---|
| 2,020,748 | 11/1935 | Waseige | 192/113 B |
| 2,144,223 | 1/1939 | Klocke | 192/107 R |
| 2,516,544 | 7/1950 | Breeze | 192/113 B |
| 2,690,248 | 9/1954 | McDowall | 192/113 B |
| 2,728,421 | 12/1955 | Butler | 188/218 XL |
| 2,927,673 | 3/1960 | Sand | 192/70.14 |
| 3,063,531 | 11/1962 | Aschauer | 192/113 B |
| 3,073,424 | 1/1963 | Russell | 192/113 B |
| 3,198,295 | 8/1965 | Fargman et al. | 192/113 B X |
| 3,897,860 | 8/1975 | Borck et al. | 192/113 B |
| 3,972,400 | 8/1976 | Howells | 192/107 R |
| 4,280,609 | 7/1981 | Cruise | 192/113 B |
| 4,286,694 | 9/1981 | Wiseman, Jr. et al. | 192/70.14 X |
| 4,287,978 | 9/1981 | Staub, Jr. | 192/113 B |
| 4,358,001 | 11/1982 | Iverson | 188/71.6 |
| 4,385,429 | 5/1983 | Crankshaw | 29/434 |
| 4,396,100 | 8/1983 | Eltze | 192/70.12 |
| 4,436,193 | 3/1984 | Smirl | 192/107 C |
| 4,560,048 | 12/1985 | Flotow et al. | 192/70.12 |
| 4,787,482 | 11/1988 | Campbell et al. | 188/71.4 |
| 4,995,500 | 2/1991 | Payvar | 192/107 R |

FOREIGN PATENT DOCUMENTS

| | | |
|---|---|---|
| 0128758 | 12/1984 | European Pat. Off. . |
| 0305582 | 8/1989 | European Pat. Off. . |
| 440674 | 2/1927 | Fed. Rep. of Germany . |
| 1199548 | 8/1965 | Fed. Rep. of Germany . |
| 2331315 | 1/1975 | Fed. Rep. of Germany . |
| 528885 | 11/1940 | United Kingdom . |
| 998578 | 7/1965 | United Kingdom . |

*Primary Examiner*—Richard Lorence
*Attorney, Agent, or Firm*—Willian Brinks Olds

[57] ABSTRACT

A groove pattern for the paper-based friction facing on a wet clutch to equalize the surface temperature of the friction facings and thus increase the thermal capacity of the clutch where there is continuous slippage. The groove pattern includes one or more continuous annular grooves dividing the friction area into two or more annular bands and a plurality of cross grooves in each band which are angled with respect to a radius of the facing. The angled cross grooves increase in number in each band from the inner band to the outer band. The angled cross grooves extend at an acute angle (10–50 degrees) to such radius. Slip of the friction pair of plates cause a viscous pumping action. The cross groove angle in each band of the facing is preferably different so as to keep all the grooves filled with cooling oil. And, the cross-section of the cross grooves vary in their dimensions as between the bands. The disclosed 60° waffle pattern includes annular bands and cross grooves extending from the inner to outer perimeters of the facing at an angle of 60 degrees to the radius of the metal clutch plate. The angled cross grooves of this pattern also provides viscous pumping of oil through the facing.

20 Claims, 4 Drawing Sheets

HIGH CAPACITY VISCOUS PUMPING GROOVE PATTERN FOR A WET CLUTCH

This is a continuation-in-part of my earlier co-pending application Ser. No. 907,937, filed Sept. 16, 1986, now U.S. Pat. No. 4,995,500.

BACKGROUND OF THE INVENTION

The present invention relates to a groove pattern for the friction facings of wet clutches; and more particularly to a viscous pumping groove pattern therefor.

Various groove patterns have been employed on the friction facings of clutch plates for wet clutches to move the coolant, such as oil, across the facing to remove heat and reduce the temperature gradient across the facing surface from the inner edge to the outer edge thereof.

The higher temperature in the facing of the clutch occurs at the outer edge because of the higher relative speed of the facing surface of the clutch and friction in engaging the corresponding plate of the clutch. In most groove patterns employed, the coolant is forced from the inner edge of the facing through the groove pattern to the outer edge by centrifugal forces. In some instances of operation at lower speeds, the centrifugal force is relatively low in which case the coolant does not move readily across the facing resulting in the outer edge portion being inadequately cooled. In the absence of adequate coolant, the clutch face temperature rise will lead to thermal failure of the clutch facing and may also cause decomposition of the oil coolant.

On the other hand, a higher speed rotation of the clutch plate relative to the friction surface of the centrifugal force may move the oil (coolant) through the grooves too rapidly such that the oil does not absorb the heat efficiently for cooling the clutch.

Various torque applying systems generate heat when the elements are engaging or when the clutch is slipping. In a standard automatic transmission, the elements slip relative to one another over a short period of time. Yet in other transmissions, such as CVT (continuous variable transmission), the elements slip over an extended time. Over a one-half second period of slipping of the elements of the wet clutches is an extended slip time. In the extended slip time of operation, the clutch requires better cooling to remove the build up of the heat.

SUMMARY OF THE INVENTION

The present invention relates to an improved groove pattern in the paper-based friction facing of a wet clutch which will provide a uniformity of temperature distribution across the clutch face and increase thermal capacity of the clutch. The friction facing is formed by molding it on a metal plate and the facing is made from paper-based friction materials, which provide better performance and at lower cost. The groove pattern formed on the friction facing of this invention is designed to cause or retard viscous pumping of the coolant oil. At slow speed of rotation or lower pressure of oil in the system, viscous pumping of the oil is produced in the groove pattern; whereas, at higher speeds of rotation centrifugal force overcomes the viscous pumping action of the groove pattern. The resultant cooling is more uniform.

The groove pattern of the invention employs angled grooves that extend across the face of the annular friction surface, the angled direction of the grooves being 10-60 degrees to the radial direction. The relative slip of the mating friction pair of elements of the clutch will cause viscous pumping action of the oil induced by the velocity components parallel to the groove axis.

In the pattern of the invention, grooves are deployed to provide two or more annular bands of the friction facing, the bands being defined by having one or more annular grooves. Angled grooves extend across each band which are at an angle to a radius of the friction face, and in one form of the invention the cross grooves increase in number from the band at the inner diameter of the friction face to the band at the outer diameter of said face. The groove angle across each band is different and is designed to keep all the grooves full of oil.

In practice, the angle of the grooves to radial direction (radius) decreases between bands from the band nearest the inner diameter proceeding to the band at the outer diameter. This feature is employed to keep the outer band grooves from oil starvation and provides hydraulic balancing of the oil flow. In some designs where the friction plate has a higher speed, the grooves may be angled in such a direction as to cause some viscous pumping inwardly from the outer diameter to the inner diameter so as to retard the flow and prevent undesirable groove starvation of oil.

The grooves in each band of the facing may be different in cross sectional dimensions from those in the other bands to achieve hydraulic balancing and heat transfer area balancing which will depend upon the design parameters for the clutch.

Further objects will appear hereinafter from the description of the preferred embodiment of the invention.

DESCRIPTION OF A PREFERRED EMBODIMENT

Figure 1:
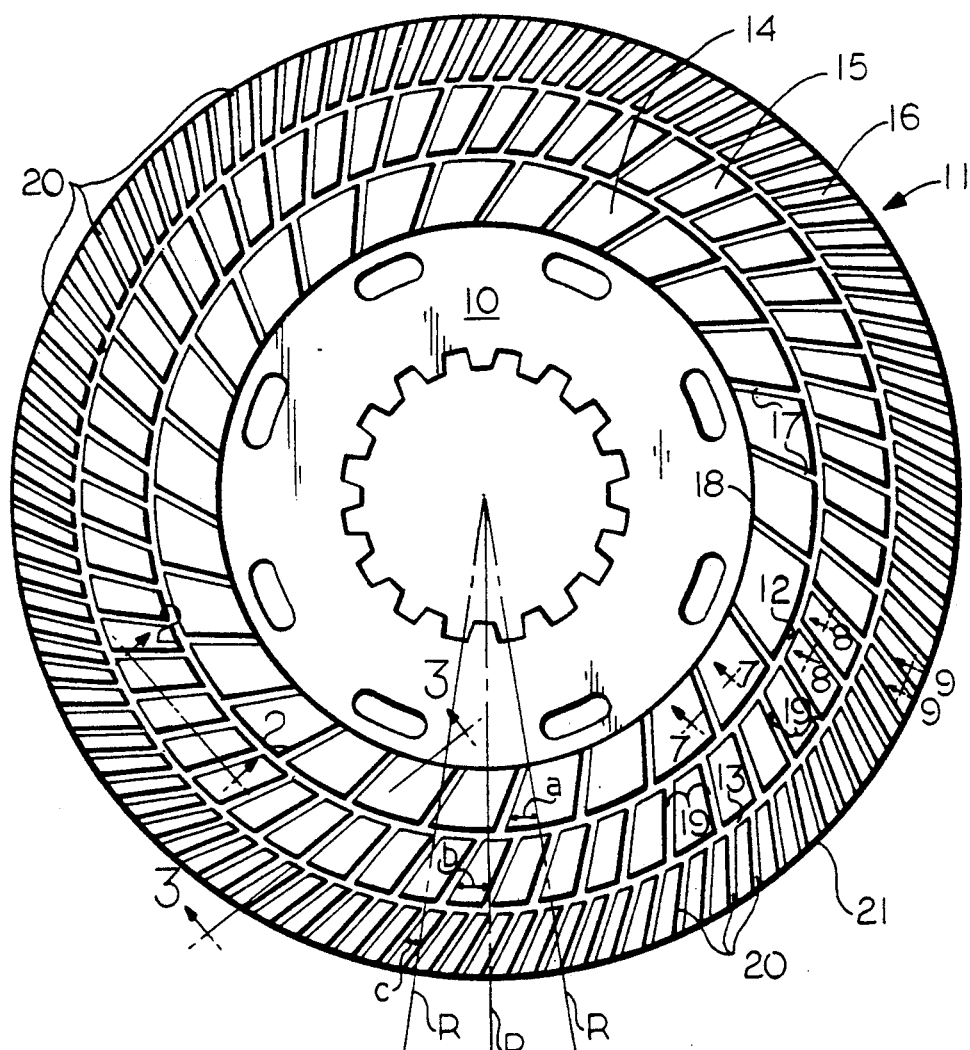
FIG. 1 is an elevational view of a wet clutch plate and friction facing of one embodiment of the invention having the groove pattern formed in the facing.
Figure 7:
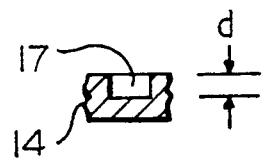
FIGS. 7-9 are fragmentary sectional views taken along lines 7—7, 8—8 and 9—9, respectively, on FIG. 1.
Figure 8:
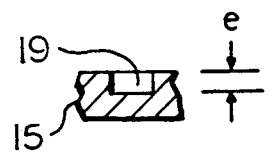
Figure 9:
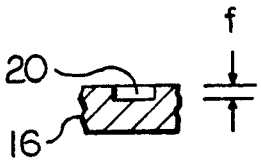
Figure 2:
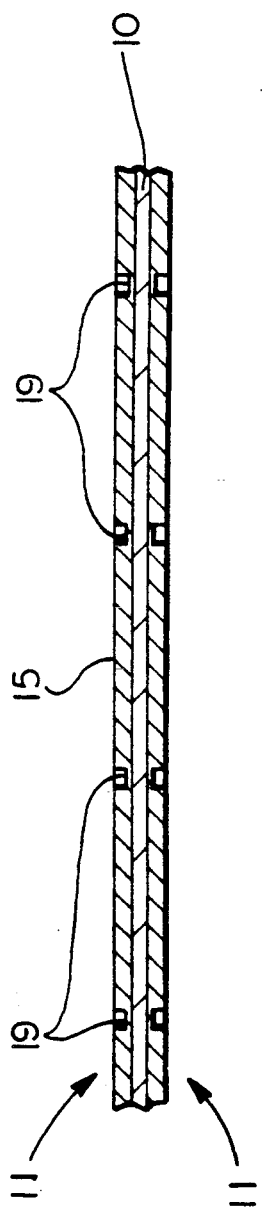
FIG. 2 is a sectional view taken along line 2—2 on FIG. 1.
Figure 3:
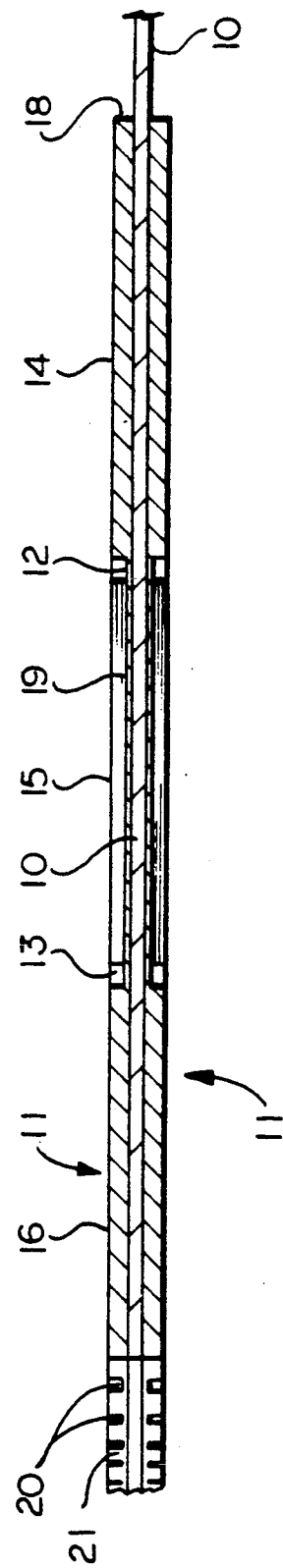
FIG. 3 is a sectional view taken along line 3—3 on FIG. 1.

The friction facing of the wet clutch plate is of paper composition plus resin binders and is a paper-based friction material. This material provides a better performance at lower cost and is a non-asbestos material that has replaced the older materials. In wet clutch applications this material combines resiliency, conformability and wear resistance that results in quiet performance over extended-use periods. Of special significance, the paper-based materials are applied on clutch plates as a facing which is easily moldable to provide a design on the clutch plate surface, such as designs herein described. The paper-based facing is a porous material having interconnecting cells which hold larger quantities of oil for use in the wet clutch.

It has been known for some time that the temperature at the interface between the friction face and the metal mating face during continuous slipping of a wet clutch, such as occurs upon initial engagement of starting clutches, reaches an equilibrium value established by a balance between the rate of heat generation and the rate of heat removal by the oil flowing in the grooves of the friction face. This equilibrium temperature, however, is not uniform over the entire friction face, but generally increased from the inside diameter to the outside diameter for the conventional groove patterns currently in use. The highest temperature, therefore, occurs at the outside diameter and limits the thermal capacity of the clutch, while the capacity of a substantial portion of the clutch facing is underutilized.

A commonly used groove pattern is the conventional waffle groove pattern for the friction facings of a wet clutch plate and includes plural grooves in the surface of each facing some of which extend annularly and others radially to form a waffle pattern. In this pattern, the annular grooves parallel each other and the radial grooves intersect the annular parallel grooves at substantially right angles. Examples of the waffle pattern are disclosed in U.S. Pat. No. 2,927,673. The waffle pattern of the friction plate face has characteristics which provide for a uniform land area per unit of total area and uniform heat removal area per unit of total area. These characteristics combine to provide an interface temperature which is lowest at the inner diameter and highest at the outer diameter.

The rotation of the grooved friction plate of a wet clutch of the present invention relative to the metal mating face of a mating plate of the clutch produces movement of cooling oil radially from the inner diameter to the outer diameter. The annular friction facing 11 of the metal clutch plate 10 extends between an annular inner edge at 18 and an annular outer edge at 21 and includes annular grooves formed in the friction facing surface illustrated at 12 and 13. The annular grooves 12 and 13 separate the facing 11 into three adjacent annular band areas 14, 15 and 16. In each of the bands 14–16 are a plurality of circumferentially substantially equally spaced apart cross grooves formed in the friction face 11 such as by cutting or stamping which extend in a direction at an angle to a radius R of the circular plate 10. The angle between the center line of the angled groove extending across the bands 14–16 and radius R is in the range of 10–50 degrees. As is shown on FIG. 1, there are a plurality of the angled grooves 17 extending across the inner band 14 from the inner edge 18 of the facing 11 to the first annular groove 12. Similarly, in the second or intermediate annular band 15 a plurality of angled grooves 19 extend between the annular grooves 12 and 13. And, in the outer annular band 16 of the facing are a plurality of angled grooves 20 which extend between the outer edge 21 of facing 11 to the annular grooves 13. The angled cross grooves residing in the respective bands are substantially parallel to one another and substantially equally spaced apart. The grooves 20 in the outer annular band 16 are closer to one another than the grooves 19 in the intermediate band 15. Likewise, the spacing between the grooves 19 of the intermediate band is closer than the spacing between the grooves 17 of the inner annular band 14.

The angularity of grooves 17 of the inner band 14 is indicated at angle "a" to a radius R of the face 11; similarly angularity of grooves 19 to a radius R is indicated at angle "b" and angularity of grooves 20 to a radius R is indicated at angle "c". In the embodiment shown on the drawings (FIG. 1), the angles "a", "b", and "c" appear to be substantially the same for sake of ease of illustration; however, it should be understood that the cross groove angle (to radius R) in the bands 14–16 may be different as between the bands and are determined in a way as to keep all the grooves full of oil. In a preferred embodiment, the angularity of the cross-grooves in one of the bands is different than that of the cross-grooves in another of the bands. Specifically, angle "a" is preferably greater than angle "b", and angle "b", in turn, is greater than angle "c". Further, it is contemplated that the grooves 17, 19 and 20 may have different cross-sectional areas. Specifically, it is advantageous in achieving hydraulic balancing and heat transfer area balancing, that the depth of the grooves 17, dimension "d", be greater than that of the grooves 19, dimension "e", and that dimension "e" be greater than dimension "f", the depth of the groove 20.

When the grooved friction plate of a standard wet clutch is operating at low speed (say, under 1000 RPM) or stationery, there is no mechanism to pump the oil through the grooves except for centrifugal forces created. In the absence of oil in the grooves, the clutch face temperature will rise and lead to hot spots or thermal failure of the clutch facing. Excess temperature will also cause decomposition of the cooling oil. In the present invention this is avoided principally by the relative slip of the mating friction pair which will cause a viscous pumping action induced by the velocity of the components running parallel to the groove axis.

The number of angled cross grooves are increased per band from the inner edge 18 to the outer edge 21 of the friction facing 11. This distribution and design brings about a uniform temperature of the interface of the wet clutch and provides it with high thermal capacity. Because the grooves are at an angle to the radial direction, the relative slip of the mating steel plate causes viscous pumping of the oil through the various grooves. This is important for thermal performance of the groove system.

By having the angularity to the radius R of the cross grooves 17, 19 and 20 respectively decreasing to match the increasing number of the grooves from the inner band 14 to the outer band 16 will keep the outer band cross grooves 20 from oil starvation. The hydraulic oil flow achieves a balancing effect.

In some instances where the friction plate of the clutch has high rotational speed, the angled grooves 17, 19 and 20 may be so directed or angled with reference to radius R as to cause a viscous pumping action directed inwardly from the outer edge 21 to the inner edge 18 of the friction facing; thereby preventing undesirable oil starvation of the grooves and retard flow of the oil caused by larger centrifugal forces at such speed.

The grooves 17, 19 and 20 across the annular bands may vary in one or both of their cross-sectional dimensions to achieve hydraulic balancing and heat transfer area balancing depending upon the design parameters for the clutch.

An example of construction of the clutch plate and facing is shown on FIG. 1. The grooves 17, 19 and 20 are each of rectangular cross-section, 0.025 inches deep and 0.05 inches wide. Placing the groove at an angle of 30° to radius R will pump approximately one gallon per minute at typical slip speeds between the matching plates of the wet clutch. Typical oil flow of other designs of wet clutch produce approximately 0.15 to 0.20 gallons per minute per clutch face. The present invention provides a marked improvement in cooling of the clutch and thereby improves the thermal capacity. This increases the overall capacity of the wet clutch.

Also, the ratio of width to depth of the several grooves may be in the order of 2:1 to provide improved recirculation of oil within the grooves. The depth of the grooves need not be uniform between the several band areas 14–16. The groove depth may vary between the several bands to achieve balancing of the flow of oil and prevent emptying the grooves of the oil due to centrifugal forces upon rotation of the clutch plate. This generally requires the angled groove depth to decrease between the inner band area 14 and the outer band area 16. The grooves 20 in outer band 16 are accordingly shallower than grooves 17 in inner band 14.

The angled grooves 17, 19 and 20 are shown on FIG. 1 in placement so as to aid oil flow from the inner edge 18 of facing 11 to its outer edge 21 for a given direction of rotation of plate 10. To retard flow of the oil so as to decrease its flow rate through the grooves, or, in the alternative, to reverse the flow from outer edge 21 to inner edge 18 of the facing, the grooves in any or all of the bands 14–16 may be angled in an opposite direction with respect to the radius R and the direction of rotation. That is to say if the cross grooves are placed as shown and the rotation of the plate 10 is in a reverse direction, the pumping action will be reversed its direction.

Another parameter is in the configuration of the annular grooves 12 and 13. These grooves may be the same width and depth, or groove 13 may be shallower or narrower, or both, than groove 12.

60° WAFFLE EMBODIMENT

Figure 4:
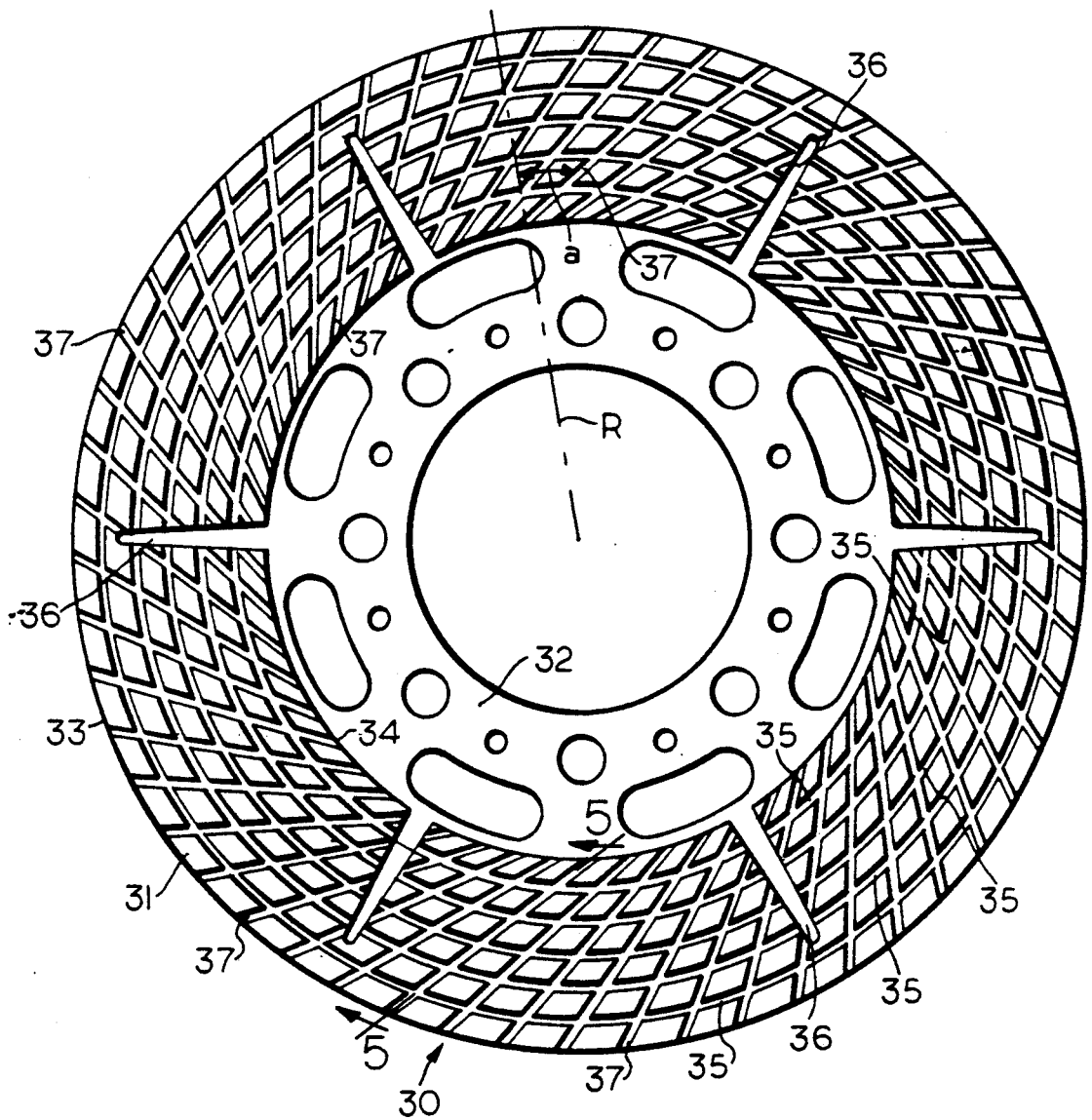
FIG. 4 is an elevational view of a wet clutch plate with friction facing for a second embodiment of the invention having the groove pattern formed on the facing.
Figure 5:
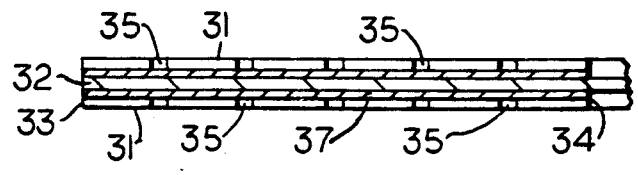
FIG. 5 is a sectional view taken along line 5—5 on FIG. 4.

Referring to FIGS. 4 and 5 of the drawings, a second embodiment of the invention is shown. In this embodiment, the wet clutch plate 30 is provided with friction facing 31 of paper-based materials. The paper-based friction material includes resins to provide a porous friction facing. As FIG. 5 illustrates, the friction facing 31 is formed on opposite surfaces of the metal clutch plate 32. The friction facing 31 is applied over an annular area from the outer annular edge 33 of the wet clutch plate to an inner annular edge 34. The groove pattern is molded on the annular area of friction facing materials of the clutch plate 32. Plural annular grooves 35 are formed (molded) in the friction facing surface 31 and are concentric about the center axis of the clutch plate. The concentric grooves are spaced apart at approximately equal distances. Five grooves 35 are illustrated on FIG. 4. The facing is also provided with radial tapered slots 36 that are full depth, or nearly so, of the facing to enhance distribution of oil for cooling into the annular area of the facing. There are a plurality circumferentially, substantially equally spaced apart cross grooves 37 formed in the friction face 31 made by cutting, stamping or molding. The cross grooves 36 extend from the inner edge 34 to the outer edge 33, and each groove 37 is at an angle to a radius R of the clutch plate that is approximately 60°. This angularity may vary depending upon the pumping action that is to be provided in the wet clutch plate. The size of the clutch plate and service will dictate the angularity for achieving the proper oil distribution for cooling. This angularity of the cross grooves 37 is indicated at angle "a" to a radius R of the friction face 31. Cross grooves being angled to the radius of the rotary plate provide a viscous pumping action on the oil to move it from the inner edge 34 to the outer edge 33. As is shown on the drawings, FIG. 4, the raised "islands" in the friction facing that are formed by the annular grooves 35 and the angled cross grooves 37 vary in area. The size of the islands near or adjacent the inner edge 34 of the facing material are smaller in area compared to the size of the islands near or adjacent the outer edge 33. In short, the islands gradually increase in size (area) progressively, from the inner edge of the facing to the outer edge thereof.

The formation provided by the annular grooves 35 separates the friction face 31 into annular concentric bands. Oil is distributed by the annular grooves 35. By having the cross grooves 37 at an angle to the radial direction, the relative slip of the mating plate of the clutch causes a viscous pumping of the oil through the grooves, which increases the supply of oil, especially to the outer peripheral zones of the clutch plate. By doing so enhances the thermal performance of the system of grooves.

As illustrated on the drawings in FIGS. 4 and 5, the cross sectional dimensions of the annular grooves 35 and cross angled grooves 37 may be approximately the same or similar. By varying one or the other of the cross sectional dimensions of the grooves in certain areas of the annular friction facing, a hydraulic balancing and heat transfer area balancing may be achieved to meet the needs of a particular wet clutch design and operational needs.

As was discussed earlier herein examples of the dimensions of the grooves and their width to depth ratio are given.

The 60° waffle design of clutch plate that is illustrated on FIGS. 4 and 5 was tested in the laboratory in a 280 CVT Oil Flow Test. In this test, the shaft input speed on the driving plate is constant 1000 RPM. The oil flow is measured and indicated on the horizontal axis of the graph at mating output plate speeds from rest in intervals up to 1000 RPM whereat the input and output plates are at the same speed; that is, the two plates are coupled together to rotate at the same speed. The oil flow rate is the vertical axis of the graph of FIG. 6, and is a measure of the cooling of the clutch. Due to viscous pumping action of the 60° waffle design of the clutch, the oil flow plotted as the curve labelled "60 degree waffle" curve produced a high rate of oil flow throughout the range from 0 RPM of the output plate up to 1000 RPM. This oil flow rate remains above 1.3 GPM throughout the test cycle.

For comparison, a similar test was run using a "straight waffle" design. The oil flow rates measured for it are plotted on the curve labelled "Straight Waffle". The straight waffle pattern is one in which a similar number of annular grooves are formed on the friction face area and the cross grooves extend on a radius from the inner edge to the outer edge of the facing. The dimensions of the grooves were similar to the groove dimensions of the 60° waffle clutch plate. Over the range of output speed 0–1000 RPM, the oil flow of this test varied from 0.5 GMP at the greatest slippage of the clutch plates to about 1.3 GPM at the point where least slippage occurs when both input and output speeds are 1000 RPM.

Figure 6:
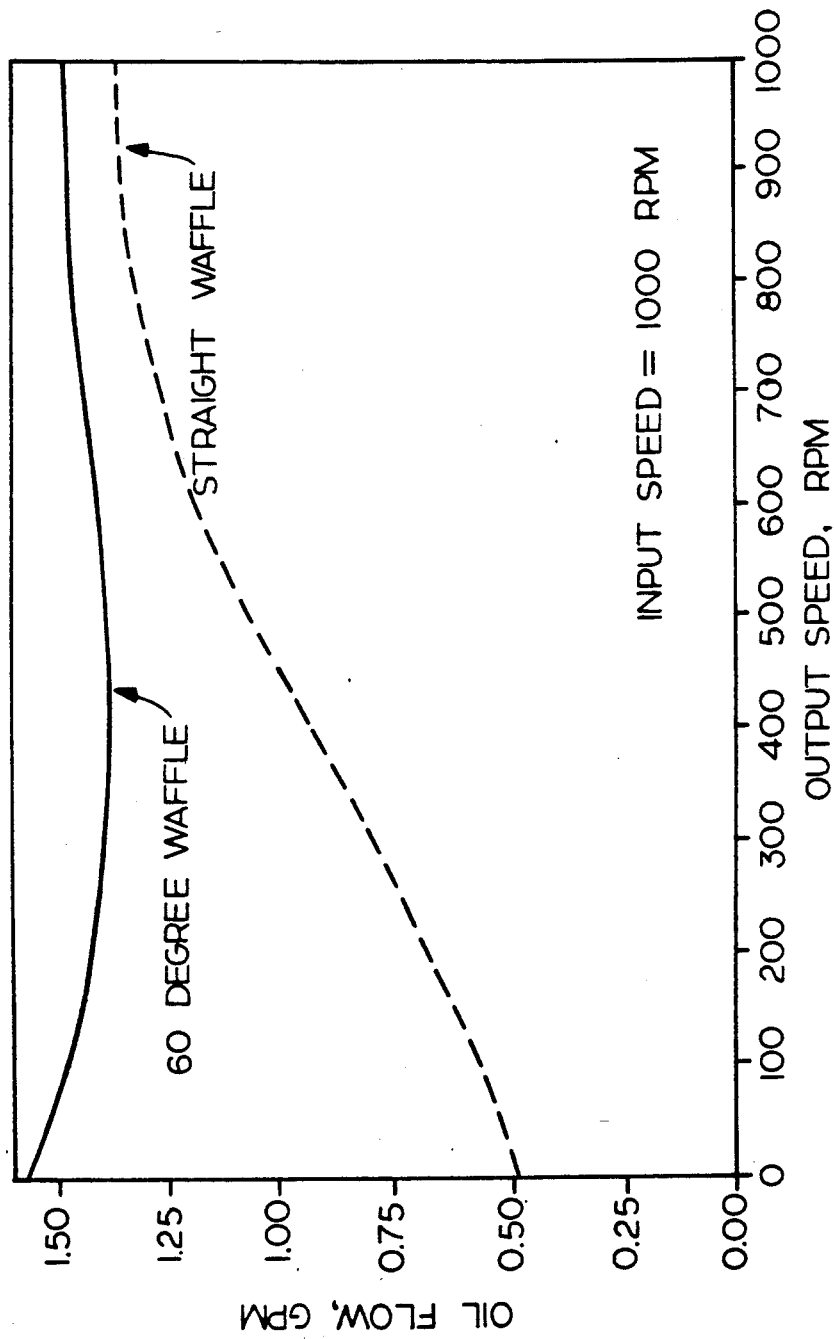
FIG. 6 is a graph of a CVT Clutch Oil Flow Test showing the output speed (RPM) plotted against Oil Flow (GPM) for the design of the embodiment of FIGS. 4 and 5 which is compared with a clutch plate utilizing the Straight Waffle design of the prior art.

The results of the test, as shown on FIG. 6, indicate that at the greatest slippage between the clutch plates the oil flow rate of the 60° waffle pattern is three fold that of the straight waffle design. Other comparisons made with other designs indicate as much as a six fold improvement of oil flow rate by using the angled cross grooves slanted at an angle that is 30° or more from the radius of the clutch plate.

Thus, the present invention employs the grooves of a wet clutch friction plate in such a way as to cause viscous pumping action of the coolant by the relative motion of the mating friction pairs. The increased cooling effect enhances the clutch rating.

The clutch plate illustrated on the drawings has a double facing 11 or 31 of the friction material. In the alternative, the clutch plate may be provided with single facing 11 or 31 depending upon the nature of the clutch and service requirements. In either event, the main principles of this invention will apply.

What is claimed is:

1. A friction facing for a wet clutch plate comprised of a paper-based annular facing on a metal plate, said facing extending between inner and outer diameters on the plate, the outer surface of said facing being grooved to receive coolant oil, the grooved facing being of a pattern comprising plural annular grooves dividing said facing surface into at least three annular bands, and a plurality of cross grooves connecting said bands, said cross grooves extending at an angle to a radius of said plate, said cross grooves connecting the inner diameter with the plural annular grooves and with said outer diameter, the said angled cross grooves causing viscous pumping of oil across the said facing.

2. The friction facing of claim 1 wherein each of said cross grooves intersects each of said annular grooves, said cross grooves and said annular grooves providing a plurality of islands on the outer surface of the facing.

3. The friction facing of claim 2 which includes plural radially outwardly extending tapered slots from the inner diameter into the annular of said facing to further enhance distribution of oil.

4. The friction facing of claim 2 in which the cross grooves are divergent from each other in their extent from the inner to outer diameter of the facing.

5. The friction facing of claim 2 in which the cross grooves are disposed at an angle to a radius of the plate that is an acute angle.

6. The friction facing of claim 5 in which the cross grooves are at an angle of approximately 60 degrees to the radius of said plate.

7. A friction facing for a wet clutch plate having an annular facing extending between inner and outer diameters and a facing surface grooved to receive coolant, wherein the grooved facing surface has a pattern including one or more annular grooves intermediate the inner and outer diameters dividing said surface into two or more adjacent annular bands, and a plurality of cross grooves extending across each of said bands and disposed at an angle with respect to a radius of the plate, said angled cross grooves in the inner band being out of alignment with said angled grooves of the next adjacent outer band and connected to one another through said annular groove between the bands, the said angled cross grooves in each said band increasing in number from the inner band to the outer band that is next adjacent thereto.

8. The friction facing of claim 7 wherein the angularity of said angled grooves extending across one of said bands is different than the angularity of said angled grooves across another of said bands.

9. The friction facing of claim 7 wherein the said cross grooves are disposed at an angle to a radius of the facing that is an acute angle.

10. The friction facing of claim 9 wherein said angle between said cross groove and said radius is in the range of 10–50 degrees.

11. The friction facing of claim 7 wherein the said angled cross grooves in each band are of a different cross-sectional dimension than that for said angled grooves in another band.

12. The friction facing of claim 11 wherein the depth of the said angled grooves in one band is different than the depth of said angled grooves in another band.

13. The friction facing of claim 12 wherein the depth of said angled grooves in the outer band is less than the depth of said angled grooves of the adjacent band.

14. A friction facing for a wet clutch plate comprised of an annular facing defined between inner and outer diameters and a facing surface grooved to receive coolant oil in a pattern comprising first and second annular grooves dividing said facing surface into three annular bands, and a plurality of radially directed cross grooves in each of said bands, said cross grooves extending at an angle to a radius of said annular facing, said cross grooves connecting the inner diameter with the first annular groove, connecting said first and second annular grooves and connecting said second annular groove with said outer diameter, the number of cross grooves in each band increasing from the inner to the outer band.

15. The friction facing of claim 14 wherein the radially directed cross grooves in one band is out of alignment with said cross grooves in the adjacent band.

16. The friction facing of claim 15 wherein the cross-sectional size of the said cross grooves in the inner band is greater than the and size of said cross grooves in the outer band.

17. The friction facing of claim 16 wherein the depth of the radially directed cross grooves in said bands varies, the depth of said cross grooves in the inner band being greater than the depth of said cross grooves in the intermediate band, and the depth of said cross grooves in the intermediate band being greater than the depth of said cross grooves in the outer band.

18. The friction facing of claim 14 wherein the said cross grooves of adjacent bands are offset from each other and are connected with one of said first and second annular grooves.

19. The friction facing of claim 18 wherein the said radially directed cross grooves across the bands are spaced apart and parallel with each other in each said band and disposed at an acute angle to a radius of said facing.

20. The friction facing of claim 19 wherein the said cross grooves in one of said bands is at a different angularity with respect to said radius than said cross grooves of the other of said bands.

* * * * *